United States Patent
Slater

[15] 3,703,004
[45] Nov. 14, 1972

[54] LEAKAGE FILTER FOR FREQUENCY MODULATED CONTINUOUS WAVE DOPPLER RADAR SYSTEM

[72] Inventor: Robert Slater, Bardonia, N.Y.

[73] Assignee: The Singer Company, New York, N.Y.

[22] Filed: July 1, 1971

[21] Appl. No.: 158,684

[52] U.S. Cl. ...................................... 343/8
[51] Int. Cl. .................................. G01s 9/44
[58] Field of Search ........................ 343/8, 7.7

[56] References Cited

UNITED STATES PATENTS 3,187,330   6/1965   Boles et al. ................. 343/8
2,909,656  10/1959   Meyer ......................... 343/8

Primary Examiner—Benjamin A. Borchelt
Assistant Examiner—G. E. Montone
Attorney—S. A. Giarratana et al.

[57] ABSTRACT

A leakage filter for a frequency modulated continuous wave Doppler radar system is provided. The leakage filter of the present invention replaces, with a single capacitor in each channel and with a receiver blanking switch, the complex leakage filter which has been used in the prior art systems of this general type. The typical prior art filter includes, for example, a capacitor bank in each channel and a complicated switch driver. In the leakage filter of the present invention, a single capacitor in each channel is charged at the beginning of every transition, and the receiver is blanked by the aforesaid receiver blanking switch during each charging interval, as will be described.

6 Claims, 4 Drawing Figures

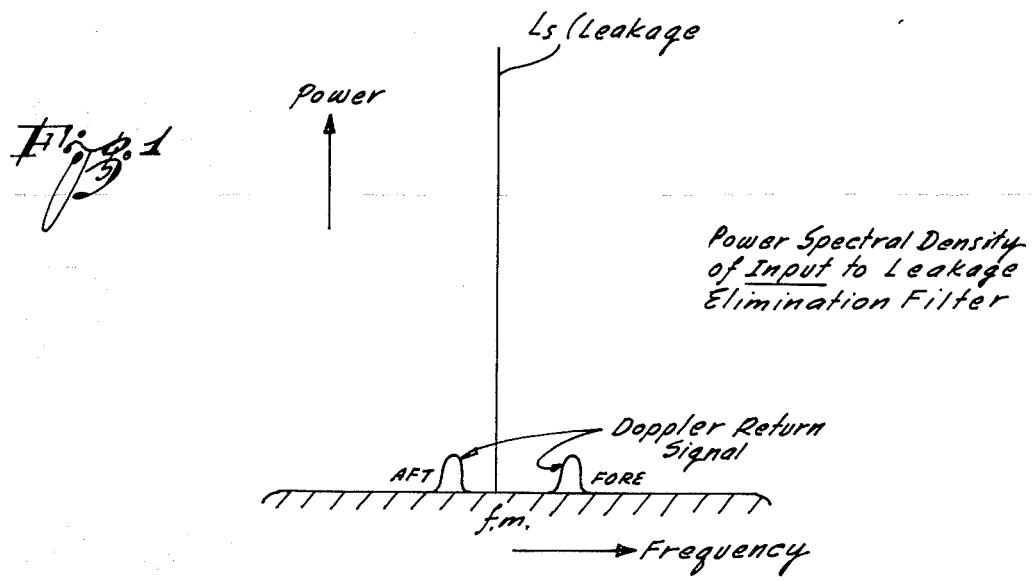
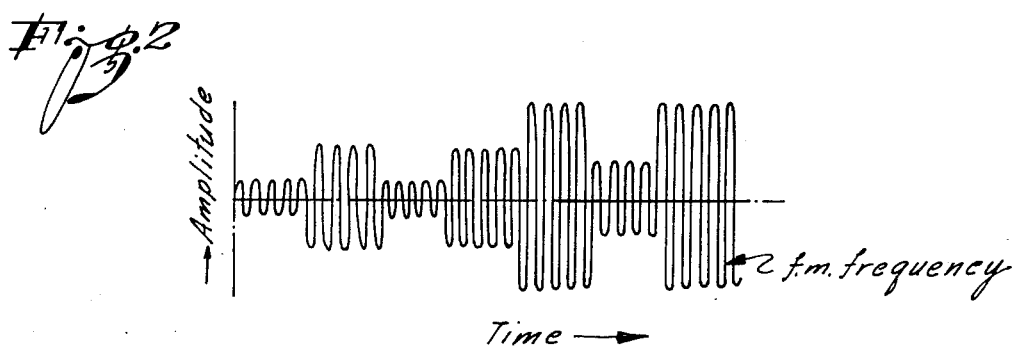
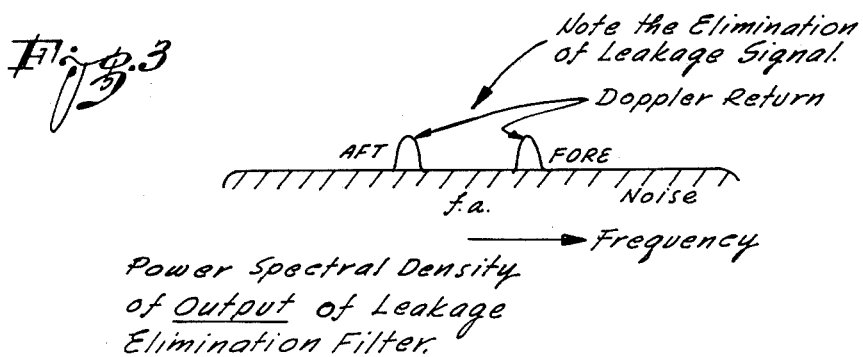

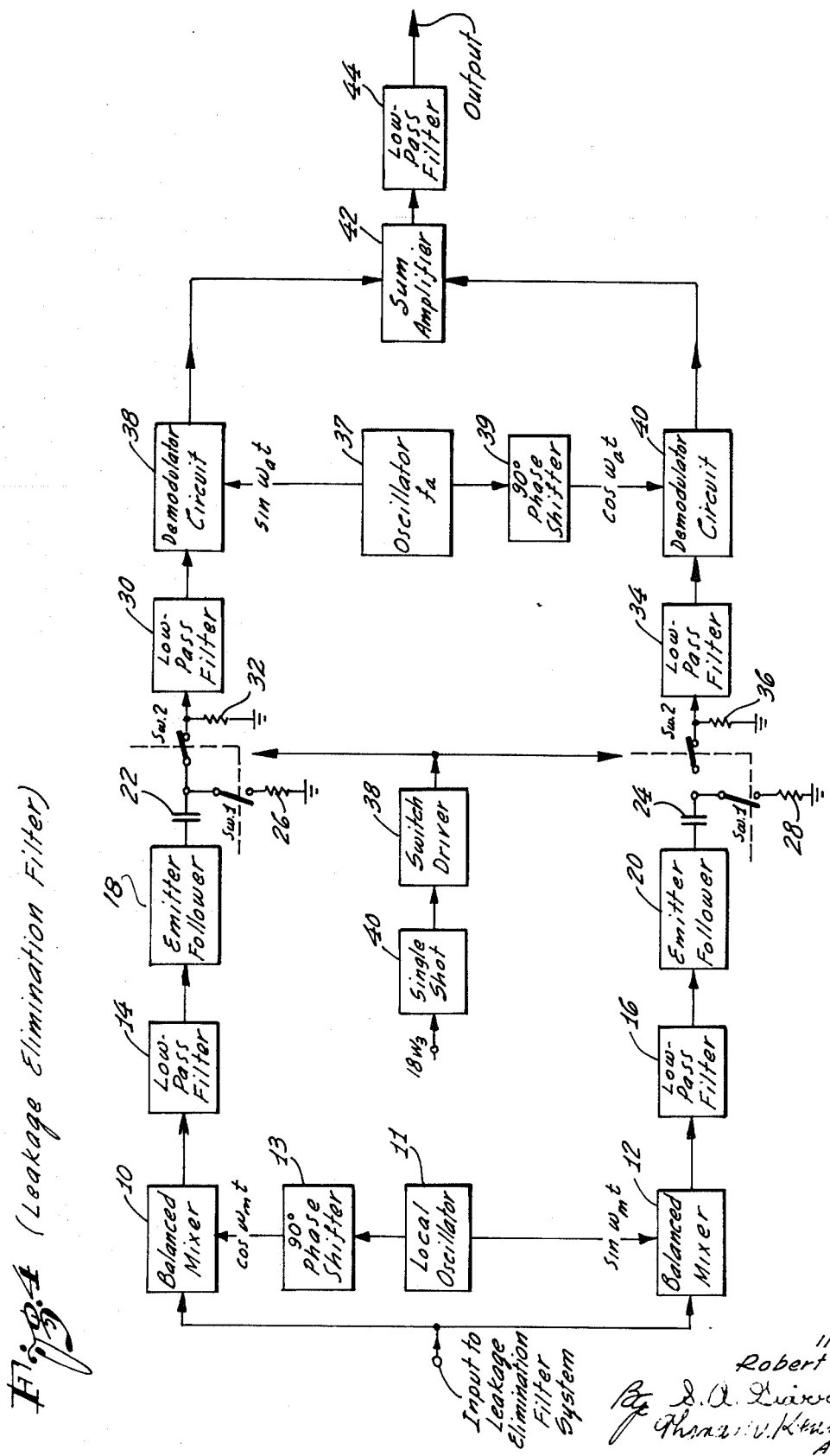

LEAKAGE FILTER FOR FREQUENCY MODULATED CONTINUOUS WAVE DOPPLER RADAR SYSTEM

BACKGROUND OF THE INVENTION

The frequency modulation continuous wave Doppler radar system is now in widespread use because of certain advantageous features of the Doppler system, which are not present in the usual prior art pulse radar systems, or in the prior art continuous wave radar systems. For example, the prior art continuous wave radar systems have certain disadvantages with regard to transmitter and receiver isolation. The prior art pulse radar systems, on the other hand, exhibit inherent difficulties in operating to zero altitude.

If transmitter-receiver pulse overlap is used in the prior art pulse type of radar system to improve the low altitude performance thereof, the transmitter leakage increases. The prior art frequency modulation continuous wave (FM-CW) type of radar system, on the other hand, assuming that the appropriate modulation frequency, modulation index, and side bands are used, is advantageous in that it can exhibit high transmitter-receiver isolation. The (FM-CW) Doppler radar system in addition to exhibiting high transmitter/receiver isolation, can operate to zero altitude, and can measure zero, negative and vertical velocities. In addition, it is possible to design a (FM-CW) Doppler radar system which provides absolute altitude measurements.

One of the reasons for the selection of a (FM-CW) Doppler system over a pure (CW) radar system is that a much greater transmitter-receiver isolation and discrimination against echoes from nearby objects are afforded by the (FM-CW) Doppler radar system. This obtains because as the relative delay between the local oscillator signal and the received signal approaches zero, as is the case for leakage signals, the received modulation index (M), and therefore the amplitude of all the Bessel sidebands except for $J_o$ approach to zero. Because of this, the $J_o$ Bessel sideband is normally not selected for use in a frequency modulated continuous wave Doppler system.

The (FM-CW) Doppler radar systems usually made use of the $J_1$ Bessel sideband because of its ability to provide adequate signal-to-noise ratio at both very high and very low altitudes. At the lower altitudes, the decrease of the total signal is balanced by an increase in the $J_1$ sideband, resulting in an essentially constant signal-to-noise ratio which is independent to altitude. This fact allows a (FM-CW) Doppler radar system to operate at ground level when using the $J_1$ sideband. At the very high altitudes, where the signal-to-noise ratio is most critical, the $J_1$ sideband selection results in fairly low modulation losses.

The $J_1$ and higher sidebands in the (FM-CW) Doppler radar systems provide considerable isolation from transmitter leakage, and from noise caused by reflections from nearby targets. However, components of leakage associated with the particular sideband, known as "sideband leakage," normally are present at the receiver input. Leakage elimination filters such as notch filters have been used in the past in an attempt to eliminate this problem, and to reduce sideband leakage to a level which can be tolerated at the receiver input.

However, a simple notch filter is usually not sufficient, because although the leakage frequency is known, the switching sidebands due to the amplitude and phase of the leakage changing for each antenna beam and f.m. frequency combination, appears to the frequency tracker as Doppler echos, and thereby cause false lock-ons and erroneous outputs. In addition, since two or more f.m. frequencies are usually employed in present day (FM-CW) Doppler systems, more than one notch filter would be required in such a system, and this would result in filtering out useful Doppler information, and would cause tracking errors.

One prior art method of leakage elimination in the (FM-CW) Doppler system is to mix the leakage signal and Doppler signal at the f.m. frequency with quadrature components of the signal at the f.m. frequency which is coherent with the leakage. The mixing is performed in "sine-cosine" manner in order to preserve the fore-aft sense of the Doppler return. At the output of the mixer, the leakage is at a direct-current level with an amplitude proportional to the amplitude of the leakage input and cosine of the phase angle of the leakage relative to the coherent local oscillator. The sum components are then filtered by a two-pole low pass filter.

However, in the prior art leakage filter systems such as described above, and when such a system is used in a typical (FM-CW) Doppler system which has, for example, eight combinations of beams and f.m. frequencies, there are eight different leakage levels. Then, in order to avoid the aforementioned problem of switching sidebands being present in the Doppler pass band to cause erratic tracker operations, the usual prior art system employs a separate capacitor for each of the eight leakage levels. Since there are usually two channels in the system, 16 capacitors are therefore required. The capacitors are sequentially switched in synchronism with the beaming and the f.m. frequency, and the leakage is effectively eliminated in the prior art system because the direct current voltages stored in the various capacitors cancel the direct current input leakage levels.

However, a disadvantage in the prior art system is the complexity of the drivers for the switch capacitors, and the number of high quality and bulky capacitors which are required. Also, the prior art system requires that the leakage amplitude and phase for a given beam and f.m. frequency component be relatively time invarient. If the orientation of the antenna to the radome should change during a sampling interval, than a change in leakage due to reflections from a radome which has been degraded due to moisture, oil coating, dirt or the like, is not filtered until the prior art leakage filter can recover. This creates a situation in which the leakage signal could enter and saturate the receiver circuitry while the leakage filter was still disabled, so as to produce erratic tracking operations.

The leakage filter of the present invention replaces the capacitor banks and complicated switch drivers of the prior art filter, as described above, with a single capacitor in each channel and, as mentioned above, the single switch driver and switching circuit which serves to blank the receiver for a short period of time, specifically less than 10 percent of its "on" time, at the beginning of every antenna beam transmission. The principle of operation of the leakage filter of the invention is to charge a single capacitor in each channel rapidly to the direct current leakage level at the beginning of every transition. During the tracking time, and as mentioned above, the receiver is blanked to prevent saturation of the receiver circuitry. Since the time required to charge the capacitor to virtually its final value is less than 10 percent of the "on" time, the only adverse effect on the system operation is, for example, a tolerable 4 percent increase in the Doppler fluctuation error.

The invention provides, therefore, an improved leakage elimination filter for use in a frequency modulation-continuous wave Doppler radar system, and which serves to reduce the complexity of the prior art leakage elimination filter presently used in such systems, and which also serves to correct certain deficiencies inherent in such prior art systems. Specifically, the system of the invention is capable of responding to leakage level changes due to reflections from a degraded radome, and to filter such reflections, so that the operation of the radar system of the invention is maintained at a high level under all possible conditions.

BRIEF DESCRIPTION OF THE DRAWINGS

FIG. 1 is a power spectral plot of the input to the leakage elimination filter of a frequency modulated-continuous wave Doppler radar system;

FIG. 2 is a representation of the leakage input to the leakage elimination filter as it appears as a square wave modulated signal at the beaming frequency, assuming that there are eight combinations of beaming and frequency modulation in the system under consideration, which re-cycles, for example, every 5 seconds;

FIG. 3 is a power spectral plot of the output of the leakage elimination filter in the frequency modulation-continuous wave Doppler radar system; and FIG. 4 is a functional block diagram of a leakage elimination filter constructed in accordance with the invention.

DETAILED DESCRIPTION OF THE ILLUSTRATED EMBODIMENT

The input to the leakage elimination filter of a (FM-CW) Doppler radar system is obtained by heterodyning the Doppler-shifted echo with the transmitted signal and processing one of the Bessel sidebands. A power spectral plot of the input to such a leakage elimination filter is shown in FIG. 1. For a system which processes the Bessel sideband ($J_1$) and has an array deck transmit-receive isolation of about 50 db for example, the leakage power ($L_S$) is expected to be about 60 db greater than the minimum Doppler signal. This necessitates removal of the leakage signal ($L_S$) before the Doppler return signal can be amplified for frequency tracker operation.

Assuming that there are eight combinations of beaming and frequency modulating, which recycle every half second, as is usual in many present day (FM-CW) Doppler radar systems, then the leakage input to the leakage elimination filter included in such a system appears as a square wave modulated signal, such as shown in FIG. 2. This square wave modulated signal is amplitude modulated by the square wave at the beaming frequency, for example, 18 Hz, with the carrier at the f.m. frequency. A power spectral plot of the output of the leakage elimination filter used in the (FM-CW) radar system is shown in FIG. 3. It will be observed in the representation of FIG. 3 that the leakage signal $L_S$ of FIG. 1 has been eliminated, and the fore-aft Doppler shifted signal is preserved.

In the leakage elimination filter system shown in FIG. 4, the input signal, including the leakage signal $L_S$ as shown in FIG. 1, is introduced to a pair of balanced heterodyne mixer stages 10 and 12. A heterodyning signal ($\sin W_M t$) is applied to the mixer 12 from a local oscillator 11, and a quadrature component ($\cos W_m t$) is applied to the mixer 10 from the local oscillator 11 through a 90° phase shifter 13. The outputs from the mixers 10 and 12 are introduced to respective low-pass filters 14 and 16, and through corresponding emitter followers 18 and 20 to capacitors 22 and 24.

As mentioned above, the heterodyne mixing of the input signal in the balanced mixers 10 and 12 is performed in a "sine, cosine" fashion in order to preserve the fore-aft sense of the Doppler return signals shown in FIGS. 1 and 3. The leakage signal output of each of the balanced mixers 10 and 12 at the f.m. frequency is a DC level with an amplitude proportional to the amplitude of the leakage signal and to the cosine of the phase angle of the leakage signal relative to the local oscillator heterodyning signal. The sum components at 2 f.m. are filtered by the two-pole low-pass filters 14 and 16. The emitter followers 18 and 20 are used so that the capacitors 20 and 24 will not load the preceding stages.

The capacitors 22 and 24 replace the bank of capacitors in the prior art leakage elimination filter system, and the complex logic switch drivers used for activating the individual capacitors in each bank in the prior art system are also eliminated. Instead, a single capacitor 22 is used in one of the channels, and a signal capacitor 24 is used in the other. The capacitor 22 is connected to a switch section SW–1 which is connected to a grounded resistor 26. The capacitor 24 is connected to a second section of the switch SW–1 which is connected to a grounded capacitor 28.

The capacitor 22 is also connected through a first section of a switch SW–2 to a low pass filter 30, the input terminal of which is connected to a grounded resistor 32. The capacitor 24 is connected to the second section of the switch SW–2 which is connected to a low pass filter 34 and to a grounded resistor 36. The switches SW–1 and SW–2 may be solid state switches, and may be driven by an appropriate switch driver circuit 38 which, in turn, is pulsed by an appropriate switching signal source, such as a single-shot multivibrator 40. The multivibrator 40 is driven at a frequency of, for example, 18 Hz to correspond with the switching modulation on the input signal, as shown in FIG. 2.

The low pass filter 30 is connected to a demodulator circuit 38, and the low pass filter 34 is connected to a demodulator circuit 40. The outputs from the low-pass filters 30 and 34 are demodulated in the demodulators 38 and 40 by the in-phase and phase quadrature components ($\sin W_a t$) and ($\cos W_a t$) respectively of the signal ($f_a$). The component ($\sin W_a t$) is derived from an oscillator 37, and the component ($\cos W_a t$) is derived from the oscillator through a 90° phase shifting network 39. The outputs from the demodulators are applied to a sum amplifier 42, the output of which is passed through a low-pass filter 44 to the receiver.

It will be appreciated that the various components shown in block form in FIG. 4 are of usual form, and need not be described in circuit detail, insofar as a clear understanding of the present invention is concerned.

As explained above, the leakage elimination filter system of FIG. 4 uses a single capacitor in each channel to replace the capacitor bank, and complicated switch drivers of the prior art system. The principle of operation of the filter system of FIG. 4 is to charge rapidly the capacitors 22 and 24 to a direct current level corresponding to the amplitude of the leakage signal in FIG. 1, and this is carried out at the beginning of each transition, as the multi-beam multi-frequency radar system is switched from one mode to another. During the charging time of the capacitors, the switch driver 38 opens the switch SW-2 and closes the switch SC-1, so that the capacitors 22 and 24 may receive the charge, and so that the receiver may be blanked during the charging intervals.

When the switch SW-1 is closed and the switch SW-2 is open, the capacitors 22 and 24 rapidly charge to virtually 100 percent of the direct current leakage levels. This occurs during a blanking time of, for example, 2.2 milliseconds which effects a greater than 60 Db leakage rejection. After the blanking period, the switch SW-1 is opened and the switch SW-2 is closed, and the Doppler return signals, shown in FIG. 3, with the direct current leakage level eliminated are then demodulated in the demodulator circuits 38 and 40 as frequency modulations about the tracker frequency $f_a$. The signal output from the low pass filter 44 then has the form shown in FIG. 3 with the Doppler return appearing as sidebands of the tracker frequency $f_a$ and with the leakage eliminated. As mentioned above, the reason two channels are used in the filter system of FIG. 4 is to preserve the fore and aft sideband components of the Doppler return signal, as shown in FIG. 3.

The invention provides, therefore, an improved leakage elimination filter system for use in a (FM-CW) Doppler radar system, and which finds particular utility in a multi-beam multi-frequency system of the aforesaid type. The filter system of the invention is advantageous in that it serves to eliminate the leakage level signals in such a radar system, as described, and of achieving its purpose in a relatively simple manner, and with a minimum of electronic components.

While a particular embodiment of the invention has been shown and described, modifications may be made. It is intended to cover all modifications which come within the spirit and scope of the invention in the following claims.

What is claimed is:

1. A leakage elimination filter for use in a multi-beam switch frequency modulation-continuous wave Doppler Radar System, with filter responding to at least one of the Bessel sidebands of a Doppler-shifted echo signal received in such a system, and a filter also responding to a leakage input having the frequency modulation frequency of the system and square wave amplitude modulated at the switching rate of the system, the filter including:

a first channel comprising a heterodyne mixer stage, a first capacitor element coupled to the output of said mixer stage, an output circuit, means including a first switching unit for intermittently disconnecting the capacitor element from said output circuit, and means including a second switching unit for intermittently connecting said capacitor element to a point of reference potential to permit said capacitor element to be charged by the output of the heterodyne mixer stage;

local oscillator means for introducing a signal to said heterodyne mixer stage having a frequency corresponding to the frequency modulation frequency of the system to cause said heterodyne mixer stage to produce a direct current charging voltage for said capacitor element corresponding to the input leakage levels;

a switch drive circuit coupled to said first and second switching units and synchronized with the aforesaid switching rate of the system actuating said switching unit for each amplitude transition of the aforesaid input, so that said first switching unit is intermittently closed to permit said capacitor element to become charged while said second switching unit is open, and so said second switching unit may be closed in alternate intervals to connected said output circuit to said capacitor element while said first switching unit is open.

2. The leakage elimination filter defined in claim 1 in which said output circuit includes a frequency modulation demodulating circuit, and in which said filter includes further oscillator means for generating a modulating signal for said demodulating circuit.

3. The leakage elimination filter defined in claim 1 and which includes a second channel comprising a second heterodyne mixer stage, a second capacitor element coupled to the output of said second mixer stage, a second output circuit, means including a first switching unit for intermittently disconnecting said second capacitor element from said output circuit, and means including a second switching unit for intermittently connecting said second capacitor element to a point of reference potential; and in which said local oscillator means introduces said signal to a first heterodyne mixer stage in phase with said frequency modulation frequency signal, and in which said local oscillator introduces said signals to said second heterodyne mixer stage phase quadrature relationship with the frequency modulation frequency signal.

4. The leakage elimination filter defined in claim 3 in which said first switches in the first and second channels, and said second switches in the first and second channels are actuated together.

5. The leakage elimination filter defined in claim 3 in which said first output circuit in the first channel comprises a first frequency modulation demodulating circuit, and said second output circuit in said second channel comprises a second frequency modulation demodulating circuit; and which includes a further oscillator for introducing a demodulating signal to said first demodulating circuit and for introducing a phase guadrature demodulating signal to said second demodulating circuit.

6. The leakage elimination filter defined in claim 5 and which includes sum amplifier means coupled to said first and second demodulating circuits and responsive to the outputs thereof to produce a common output from said leakage elimination filter.

* * * * *